United States Patent [19]
Dardashti

[11] Patent Number: 5,553,720
[45] Date of Patent: Sep. 10, 1996

[54] STORAGE AND DISPLAY ASSEMBLY FOR MUSICAL MEDIA OR THE LIKE

[76] Inventor: Shahriar Dardashti, c/o Atlantic, Inc., 10240 Matern Pl., Santa Fe Springs, Calif. 90670-0399

[21] Appl. No.: 177,683

[22] Filed: Jan. 6, 1994

[51] Int. Cl.$^6$ ...................................................... A47F 7/00
[52] U.S. Cl. .............................. 211/40; 211/41; 211/189; D6/407
[58] Field of Search ............................... 211/40, 41, 131, 211/70.1, 72, 73, 189, 194, 915; 206/387, 457; D6/407, 450, 470; D33/14

[56] References Cited

U.S. PATENT DOCUMENTS

| D. 174,189 | 3/1955 | Oehling | D33/14 |
| D. 183,681 | 10/1958 | Deaver | D56/1 |

(List continued on next page.)

FOREIGN PATENT DOCUMENTS

| 9106686 | 8/1991 | Germany . |
| 9110569 | 10/1991 | Germany . |
| 9115587 | 2/1992 | Germany . |
| 9200776 | 5/1992 | Germany . |
| 9114424 | 3/1993 | Germany . |
| 9216843 | 3/1993 | Germany . |
| 2070915 | 9/1981 | United Kingdom .................. 211/189 |

OTHER PUBLICATIONS

Advertisement, Probell; Handelgesellschaft mbH; Hamburg, Germany; Circa, Mar. 1991.
Audio Accessories/CD; Wholesale Price List; Atlantic Representations, Inc.; Effective Jun. 1, 1991; No. PRCD91.
CD Storage System; Atlantic Representations, Inc.; Copyright 1991.
Expandable CD Storage System; Atlantic Representations, Inc.; Copyright 1991.
CD Towers; Item B–D; XD61407; Home Decorator Collection Catalogue; Rec'd (USPTO) Sep. 14, 1992; p. 22
Metal Towers—CD, Cassette & VHS Storage System; Atlantic Representations, Inc.; Copyright 1992.
Access Collection Modular Storage System for 3½ Inch Diskettes and CD Roms; Atlantic Representations, Inc.; Copyright 1993.
Metal Storage System—Towers, Modules, Accessories; Atlantic Representations, Inc.; Copyright 1993.
Wholesale Price List; Atlantic Representations, Inc.; Effective Oct. 1, 1993; No. PRAV93–1.
CD Man; Los Angeles Times Magazine; Feb. 6, 1994, p. 35.
The CD Tower; Phil Patton; The New York Times; Mar. 14, 1994; p. 11.
Model 1108–Floor Lamp/CD Tower; Frontgate–Enhancing Your Home; Winter 1994.
Side by Side CD Storage Rack; Great! American Oak; (Date unknown).
Swivel Base CD Storage Rack; Great! American Oak; (Date unknown).

*Primary Examiner*—Robert W. Gibson, Jr.
*Attorney, Agent, or Firm*—Poms, Smith, Lande & Rose, P.C.

[57] ABSTRACT

An assembly for storing and displaying discs, cassettes, game cartridges, tapes or the like, including an elongated straight side-walled storage unit forming a column of longitudinally-spaced storage slots. First and second side members are secured to the opposite lower sides of the storage unit and extend out from it. A top member is secured to the storage unit and extends up from it. The side members and top member are configured such that together with the storage unit they define in front view a readily-recognizable outline of a common (non-storage unit) object, such as a guitar or other musical instrument. The slots or rib spaces of the storage unit define, when the object is a stringed musical instrument, the frets thereof. An interesting, attractive and readily identifiable storage and display assembly is thereby defined. The side and/or top members can also provide surfaces to which holders for holding special tapes or cases are face mounted. The entire assembly can be mounted flat against a wall or upright to a base. When mounted to a base, the side members themselves can be directly secured to the base to further brace and support the elongated storage unit upright on the base.

38 Claims, 12 Drawing Sheets

U.S. PATENT DOCUMENTS

| | | | |
|---|---|---|---|
| D. 263,529 | 3/1982 | Magyar | D6/153 |
| D. 302,278 | 7/1989 | Harrower, III | D17/15 |
| D. 319,741 | 10/1991 | Sylvester | D6/407 |
| D. 329,668 | 10/1992 | Connelly | D21/59 |
| D. 331,166 | 11/1992 | Ohadi | D6/570 |
| D. 333,225 | 2/1993 | Robinson | D6/407 |
| D. 337,453 | 7/1993 | Mattikow | D6/407 |
| D. 337,919 | 8/1993 | van der Molen | D6/407 |
| D. 340,155 | 10/1993 | Koziol | D6/450 |
| D. 342,172 | 12/1993 | Schonhofen | D6/474 |
| D. 342,395 | 12/1993 | Huang | D6/407 |
| D. 343,074 | 1/1994 | Whiteaker et al. | D6/451 |
| D. 343,533 | 1/1994 | David | D6/407 |
| D. 344,360 | 2/1994 | Yeh | D26/106 |
| 1,650,164 | 11/1927 | Travaglini . | |
| 1,652,114 | 12/1927 | Gestrine . | |
| 2,205,064 | 6/1940 | Irwin | 53/5 |
| 2,222,831 | 11/1940 | Bitney | 248/91 |
| 3,208,598 | 9/1965 | Glassenberg | 211/49 |
| 3,220,557 | 11/1965 | Brandes | 211/40 |
| 3,543,943 | 12/1970 | Joy et al. | 211/131 |
| 3,633,761 | 1/1972 | Holliday | 211/131 |
| 3,889,817 | 6/1975 | Berkman | 211/163 |
| 3,938,665 | 2/1976 | Rumble | 211/4 |
| 4,056,260 | 11/1977 | David | 366/144 |
| 4,228,902 | 10/1980 | Schulte | 211/41 |
| 4,293,075 | 10/1981 | Veralrud | 211/40 |
| 4,358,018 | 11/1982 | Wolfe | 211/41 |
| 4,453,785 | 6/1984 | Smith | 312/10 |
| 4,630,737 | 12/1986 | King | 211/40 |
| 4,655,345 | 4/1987 | Drake et al. | 206/309 |
| 4,702,369 | 10/1987 | Philosophe | 206/312 |
| 4,709,815 | 12/1987 | Price et al. | 206/387 |
| 4,730,739 | 3/1988 | Semerau, Jr. | 211/189 |
| 4,762,689 | 8/1988 | Frey et al. | 422/310 |
| 4,819,801 | 4/1989 | Howard | 206/387 |
| 4,872,554 | 10/1989 | Quernemoen | 206/454 |
| 4,911,308 | 3/1990 | Nylund | 211/41 |
| 4,932,522 | 6/1990 | Milovich | 206/309 |
| 4,940,147 | 7/1990 | Hunt | 211/40 |
| 5,054,626 | 1/1991 | Stempinski | 211/40 |
| 5,129,525 | 7/1992 | Maynard, Jr. | 211/133 |
| 5,195,642 | 3/1993 | Dardashti | 211/41 |
| 5,199,577 | 4/1993 | Curtis | 211/40 |
| 5,219,079 | 6/1993 | Nakamura | 211/41 |
| 5,301,819 | 4/1994 | Moeken | 211/40 |
| 5,314,077 | 5/1994 | Theosabrata | 211/40 |
| 5,341,943 | 8/1994 | Fraser | 211/40 |
| 5,358,124 | 10/1994 | Mueller | 211/41 |
| 5,370,242 | 12/1994 | Huang | 211/40 |

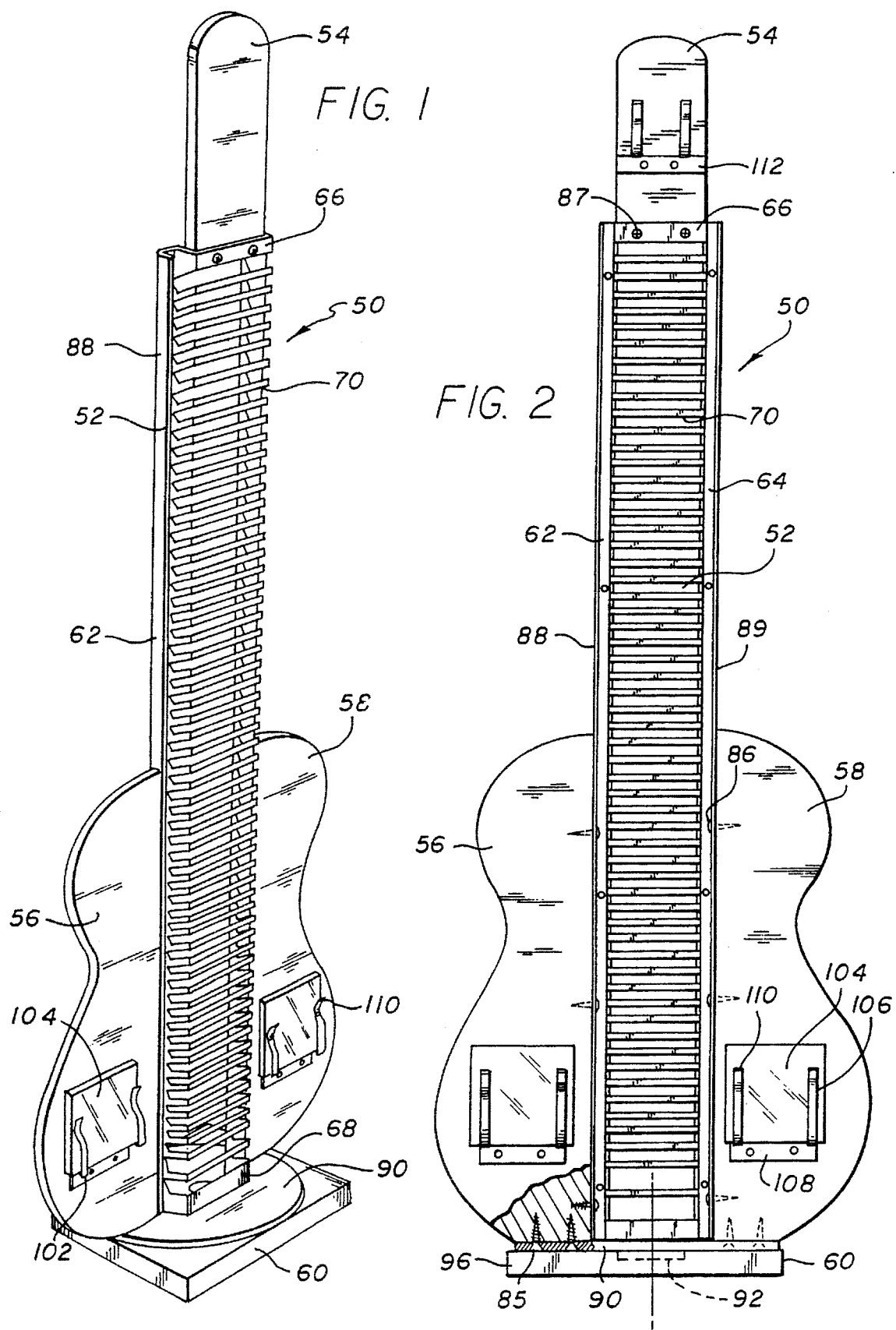

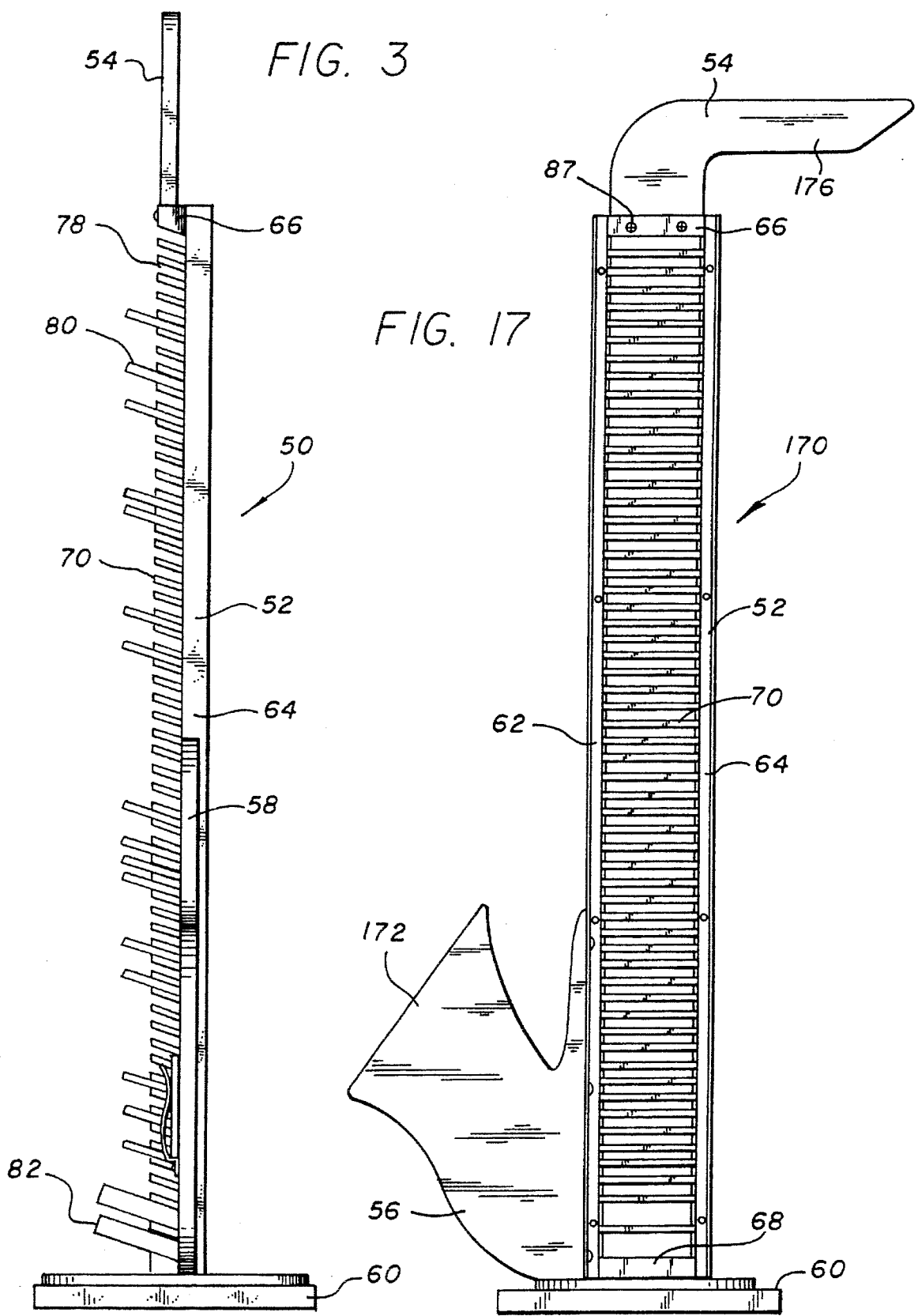

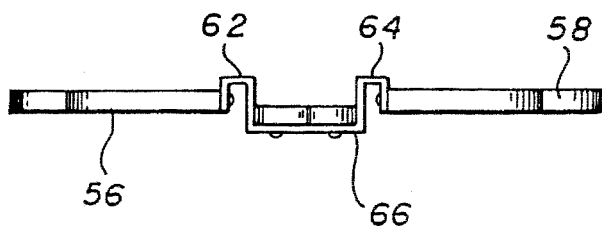
FIG. 5
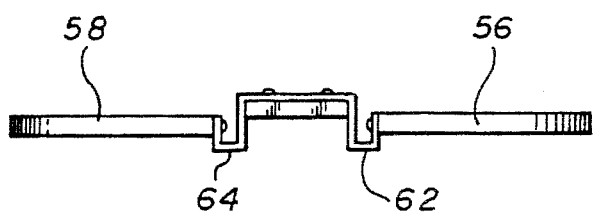
FIG. 6
FIG. 7
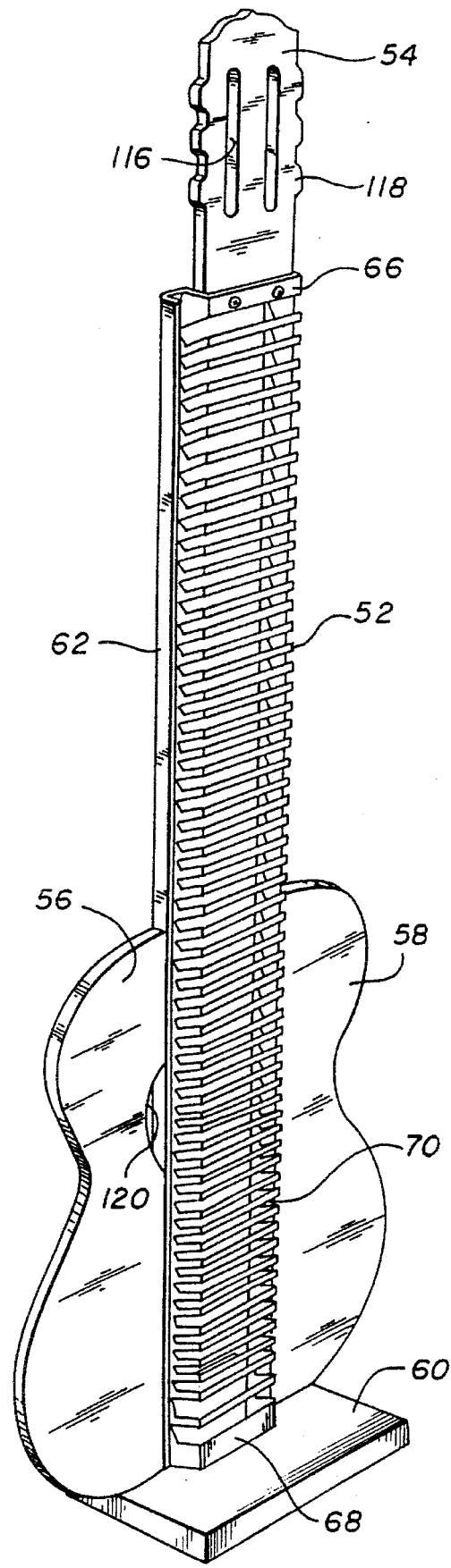

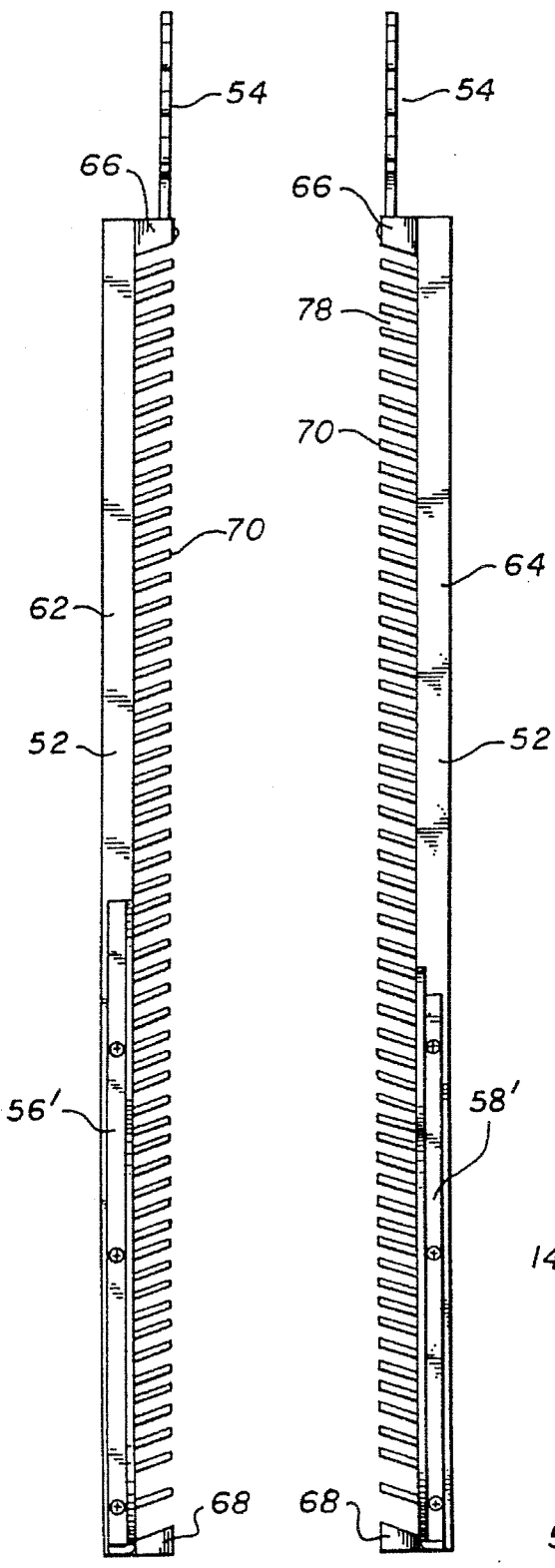
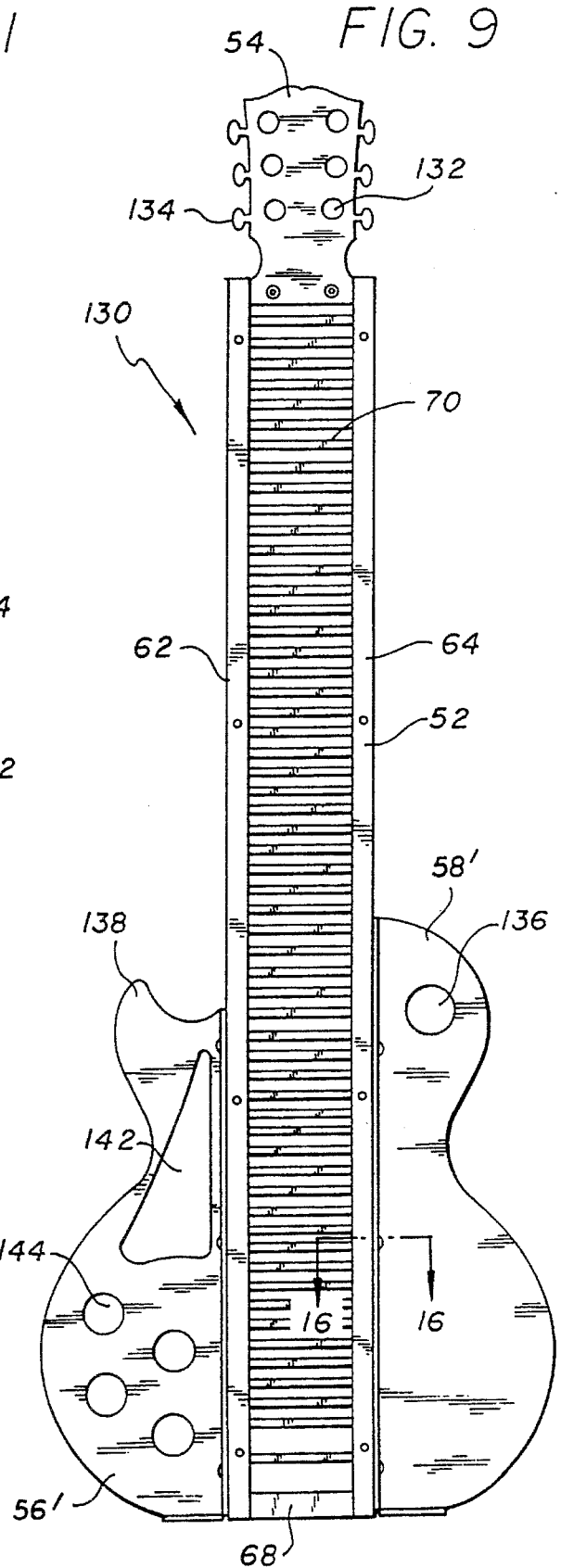

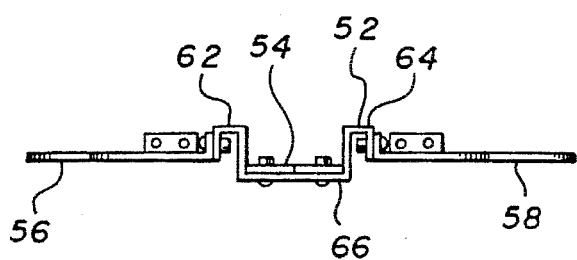
FIG. 12
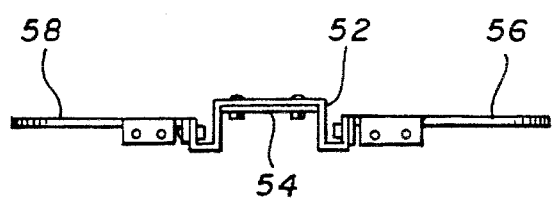
FIG. 13
FIG. 14
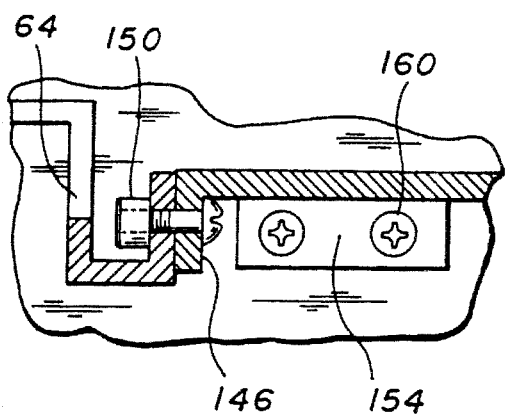
FIG. 16
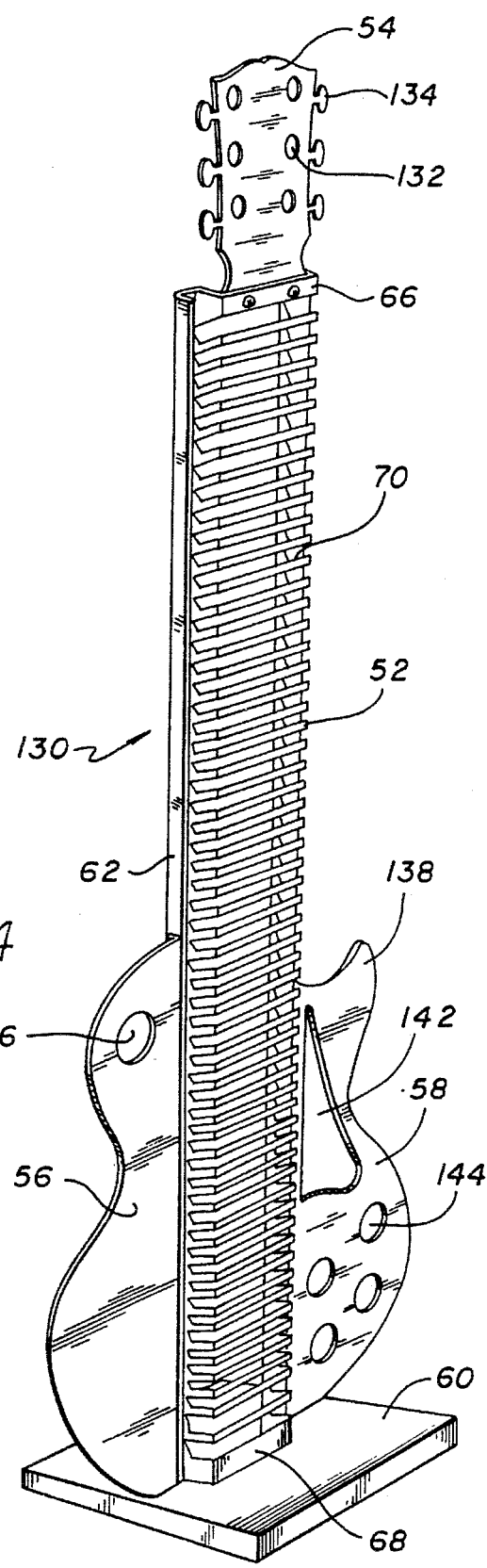

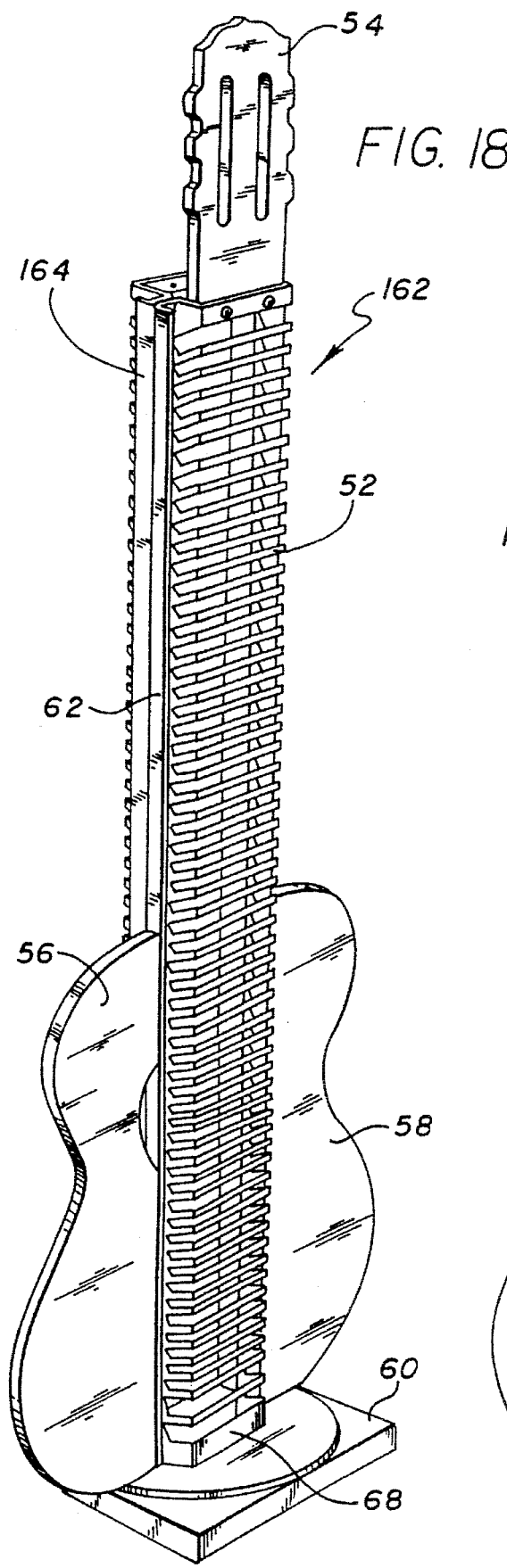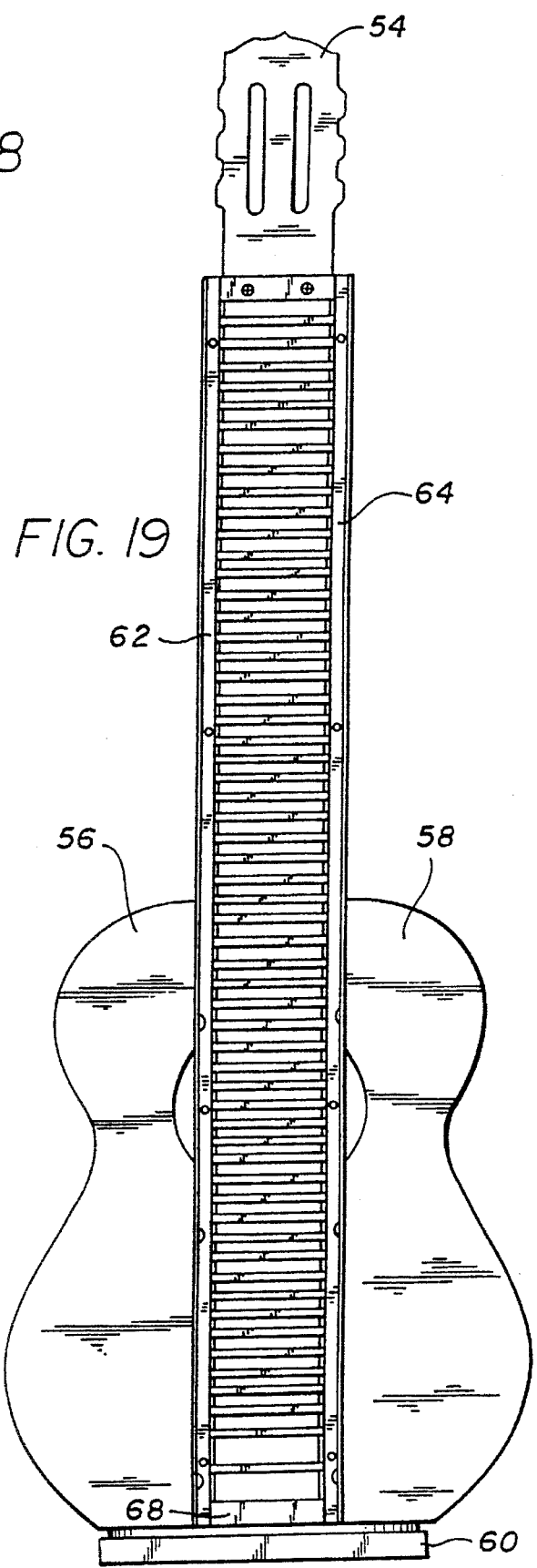

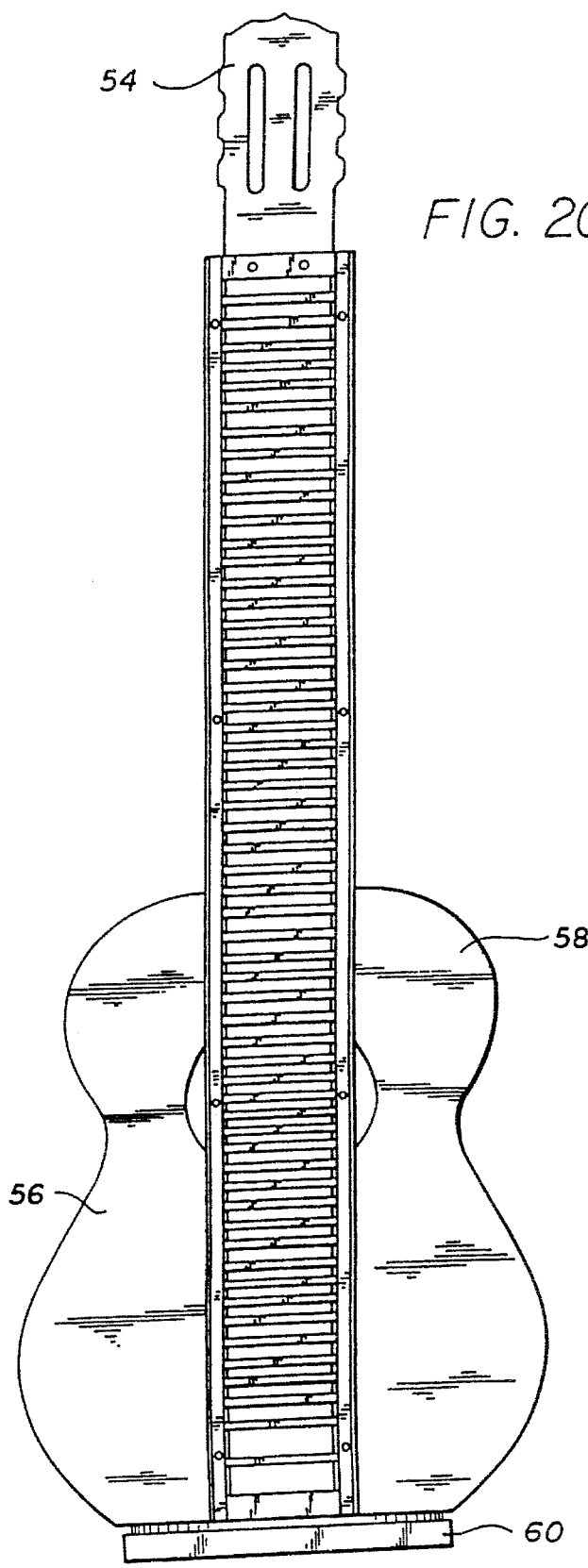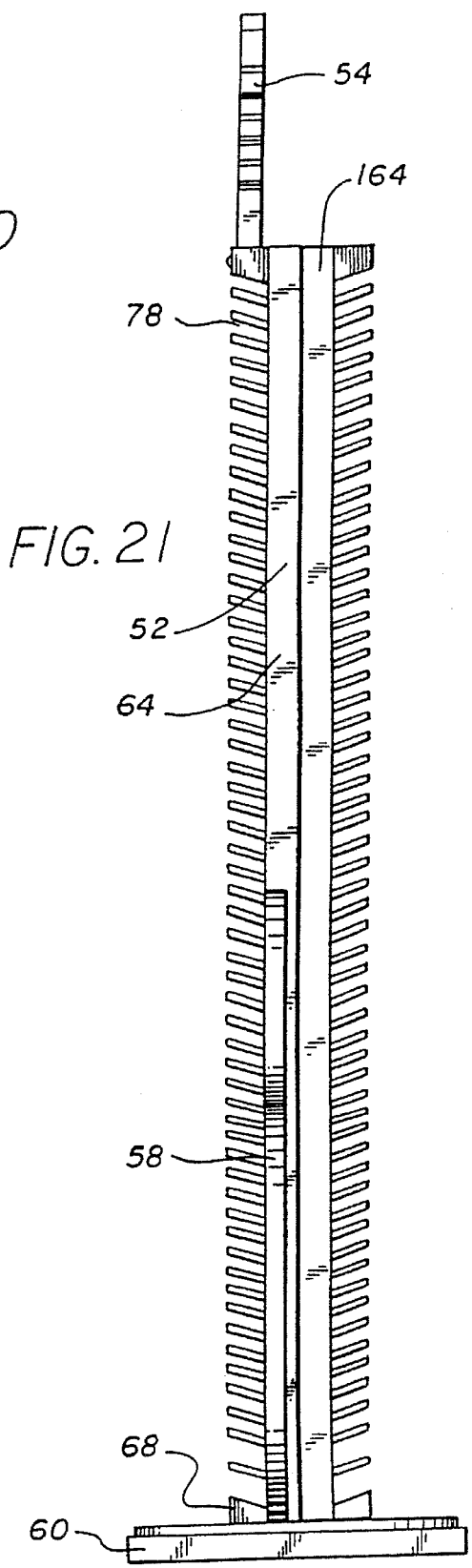

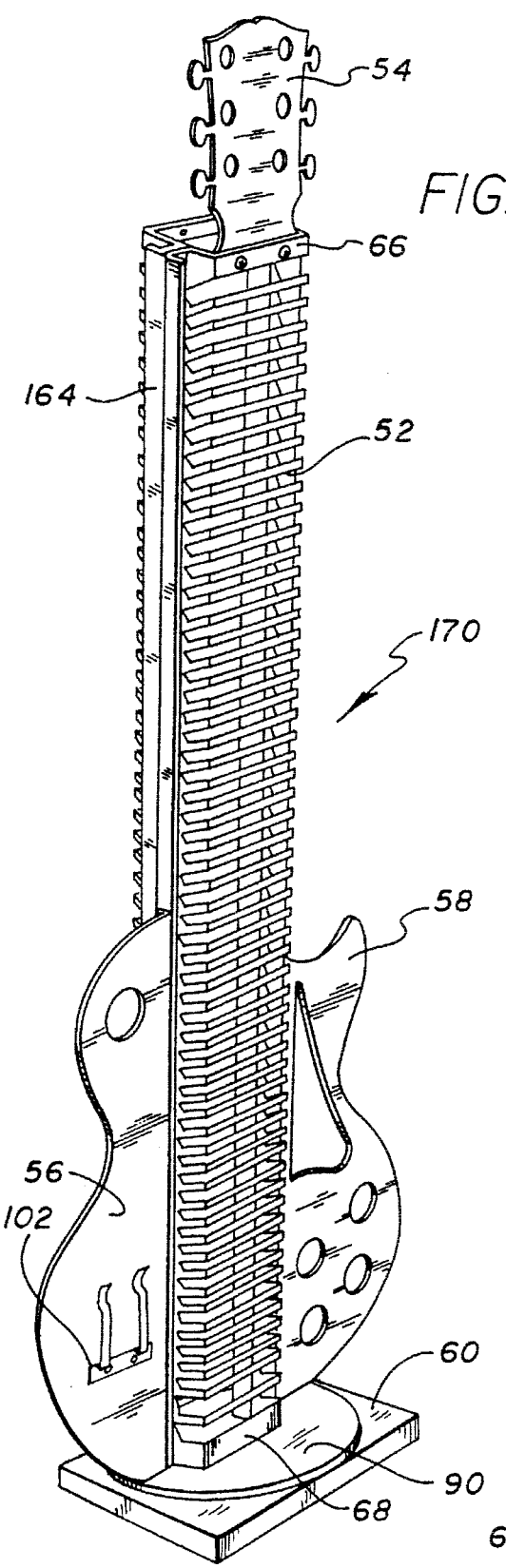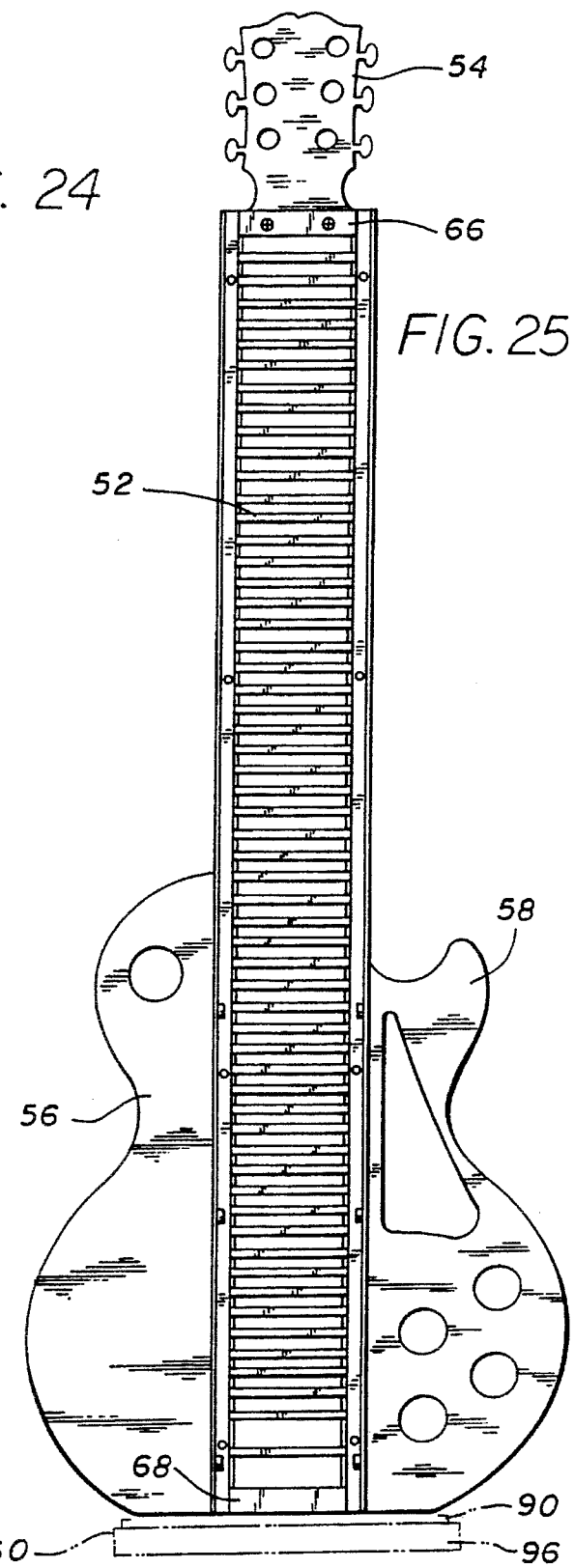

STORAGE AND DISPLAY ASSEMBLY FOR MUSICAL MEDIA OR THE LIKE

BACKGROUND OF THE INVENTION

The present invention relates generally to display or storage racks and units. It more particularly is concerned with assemblies for displaying and storing laser or compact discs, video tapes, audio tapes, cassettes, and game cartridges.

Laser discs, compact discs, video tapes, audio tapes, video cassettes, audio cassettes, game cartridges and the like (hereinafter referred to collectively as "cases" for the sake of brevity) have become extremely popular in recent years, with many households or small businesses owning a hundred or more of them. Numerous systems for conveniently and neatly displaying and storing these cases have thus been developed. An example of a popular system is that shown in U.S. Pat. No. 5,195,642 ('642) of the present invention. (This patent and all other patents and other publications mentioned in this disclosure are hereby incorporated by reference in their entireties.) Examples of other prior storage units are those shown in the following publications of Atlantic Representations, Inc., of Santa Fe Springs, Calif.: "The Storage Tower Collection—A Unique Modular System," copyright 1992; "Metal Towers—CD, Cassette and VHS Storage System," copyright 1992; "Metal Storage System," copyright 1993; "Atlantic Wholesale Price List, Effective Jan. 1, 1993, No. PRAV93-1;" "Access Collection—Modular Storage System," copyright 1993; and "Wire Storage Racks." A further example is that shown in the advertisement of Probell Handelsgesellschaft mbh, of Hamburg, Germany, Mar. 1991 (hereinafter "Probell"), which was cited in the '642 patent. Additional patents were cited and/or mentioned in the '642 patent and all of them are also specifically hereby incorporated by reference.

The '642 patent shows a design wherein the basic storage unit is a tower having opposing frame members with ribs extending between them to define a stack of longitudinally spaced slots, each of these slots being generally horizontally disposed. This patented system can be built in modular units which can be mounted to each other, walls, base units, and/or the like in various patterns. The cross-section of the basic modular unit has a generally pentagonal configuration with the back side open. This configuration provides a very stable tower design, not tending to tip over. When the units are mounted back-to-back on a rotatable base, they can be rotated together and the cases in the alternative first and second units can be accessed as desired. The slots can also be of different sizes, particularly different heights, so that a single storage unit can accommodate cases of different sizes or types, and particularly widths, for example, a thin CD case as well as thicker VHS cassette cases.

Aside from the pentagonal shape, another known configuration is a thinner rectangular type configuration having opposing flanged side members. This configuration is available from Fury Products of Chino, Calif., and is advertised as being "a wall mount CD rack made of solid steel for holding fifty Cds". This design is attractive. However, because of its thin width dimensions it is not stiff and upright self-supporting even when mounted directly to a base, when mounted back-to-back with a similar unit and then mounted directly to a base, or when a support plate is welded to the bottom thereof. Thus, back wall or outer frame types of supporting structure have been needed to support it. An example of the "back wall" is the "Side by Side CD Storage Rack" available from Great! American Oak, and an example of the outer frame is the "Swivel Base CD Storage Rack" which is also available from Great! American Oak. These outer frames and back walls can be costly, heavy and/or unattractive.

Thus, an improved assembly construction which provides for a more stable mounting of the upright storage tower to a base is desired. This is particularly so where a thin type of storage unit construction is used, such as that described above.

The known prior art storage systems further do not provide for the designation of specific different locations for holding "special" cases. These "special" cases can include the user's favorite or most frequently played cases, the currently most popular cases, or the empty outer case or box itself where the cassette, CD, tape or the like has been removed therefrom and is being played.

Most of the prior art storage units are configured as straight towers. However, as previously mentioned, the '642 patent discloses how these towers can be attached to each other in various combinations, such as side-by-side, back-to-back, or laterally between parallel columns, and so forth. Further, the top portion of these columns can be configured with a cone-like or pointed shape. However, all of these configurations are basically simple geometrical designs using straight lines. Some people may find these designs to be not particularly interesting or decorative. Further, especially for a single tower, the use of the unit may not be quickly identifiable especially when displayed in a crowded room with other types of furniture. Thus, a more decorative, attractive, and easily identifiable design for display and storage units is desirable.

SUMMARY OF THE INVENTION

Directed to remedying the above-mentioned disadvantages in the prior art, an improved display or storage assembly for cases is herein disclosed. The assembly according to one embodiment thereof includes a vertical storage unit, first and second side members, and a top member. Each of these components can be provided to the end user disassembled and in a single box. As will be appreciated, providing the assembly in a disassembled condition allows for smaller boxes to be used and thus more compact storage and transport thereof. It further provides for easy replacement of components and substitution of components as needed. It makes the assembly less vulnerable to impact damage in the transport thereof. The components can be assembled together using suitable fasteners such as wood or metal screws, which also provides for the disassembly thereof when needed. However, the present invention also includes providing the entire assembly in an assembled condition and even manufacturing the components as a single unit.

Although the storage unit preferable will be the above-described thin rectangular type of tower construction, the pentagonal construction of the '642 patent or other tower constructions of the prior art can be used. The top member is secured to the top of the storage unit and the first and second side members are secured to the lower left and right sides of the storage unit, to form the assembly. When thereby secured together the top member, side members, together with the storage unit, define the outline of an easily-recognizable common object, an object which is not a case storage unit. The storage unit itself defines preferably a substantial or discrete portion of this object, such as the trunk or the neck thereof. A preferred design or object is a musical instrument, such as an electric guitar, an acoustic guitar or a saxophone. And a preferred musical instrument is a stringed instrument, since the frets of the instrument conveniently correspond to the slots of the storage unit. Since the cases typically are for musical media, the relationship becomes more apparent with this design; in other words, the purpose of the storage assembly is more readily appreciated. Having this object defined provides for a more attractive display of the storage unit, whether mounted to a wall or a base. The top and side members also form vertical surfaces on which devices can be mounted for holding the "special" cases as discussed above.

When the storage assembly is mounted by itself or with a similar unit in back-to-back relation on a rotatable base, the top member forms a convenient grasping, turning or spinning handle for turning the unit so that the storage unit can be reoriented as desired.

Further, when the assembly is to be mounted upright to a base the side members can conveniently provide at the lower surfaces thereof additional bracing structure for supporting the tower storage unit upright. The side members can be secured, when made of wood, by wood screws through the base into the lower edge surfaces of the side members. When the side members are made of metal they can be provided with horizontal lower flanges into which screws or other fasteners can pass. This bracing function can also be performed without fasteners by simply positioning the side members abutting against and on the base member at a distance spaced outwardly from the base unit and securing the side members then directly and only to the side frames of the storage unit itself.

Other objects and advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 1 is a perspective view of (an acoustic guitar) storage assembly of the present invention.

FIG. 2 is a front elevational view of a variation of the embodiment of FIG. 1 with a top holder provided and with a portion of the figure broken away for illustrative purposes.

FIG. 3 is a side elevational view of the assembly of FIG. 1, with various cases shown inserted therein in their storage and display positions.

FIG. 5 is a top plan view thereof.

FIG. 6 is a bottom plan view thereof.

FIG. 7 is a perspective view of the assembly of FIG. 4 shown mounted on a base.

FIG. 9 is a rear elevational view thereof.

FIG. 10 is a left side elevational view thereof.

FIG. 11 is a right side elevational view thereof.

FIG. 12 is a top plan view thereof.

FIG. 13 is a bottom plan view thereof.

FIG. 14 is a perspective view thereof showing the base mounted embodiment thereof.

FIG. 16 is a cross-sectional view taken on line 16—16 of FIG. 9.

FIG. 17 is a front elevational view of a further (a saxophone) embodiment.

FIG. 18 is a perspective view of a further (a double-sided acoustic guitar) embodiment.

FIG. 19 is a front elevational view thereof.

FIG. 20 is a rear elevational view thereof.

FIG. 21 is a right side elevational view thereof; the left side elevational view being a mirror image thereof.

FIG. 24 is a perspective view of a further (a double-sided, rotatable base mounted electric guitar with a "special" case holder) embodiment.

FIG. 25 is a front view of an embodiment identical to that of FIG. 24 but without the holder and with the rotatable base shown with phantom lines.

DETAILED DESCRIPTION OF PREFERRED EMBODIMENTS OF THE INVENTION

Figure 4:
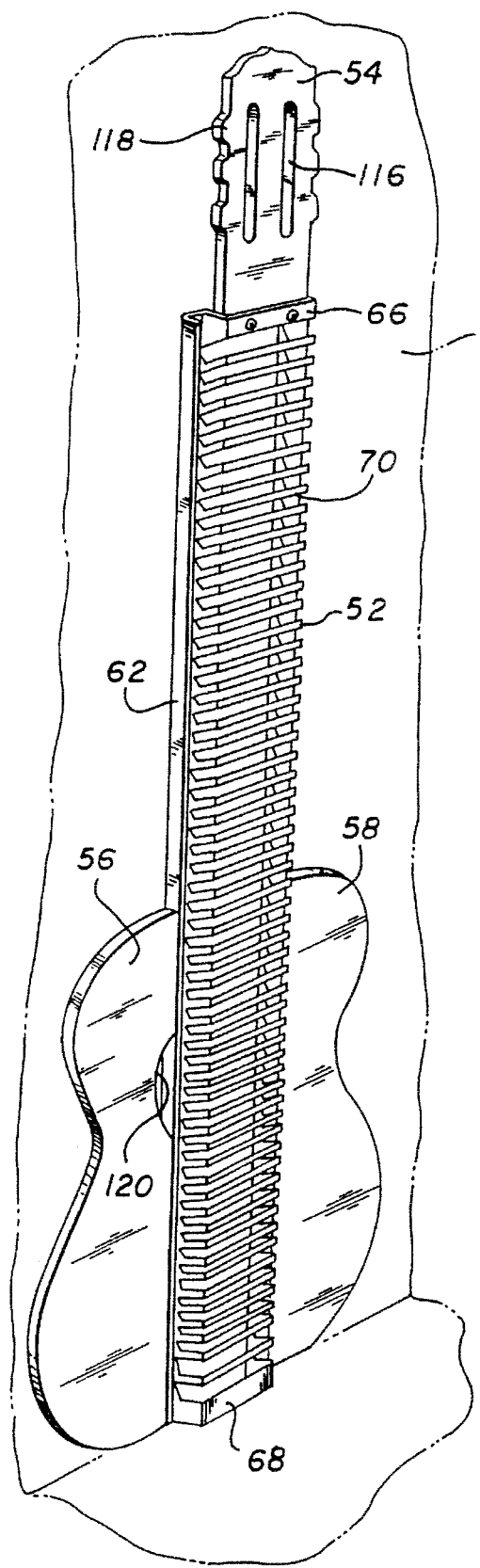
FIG. 4 is a perspective view of another embodiment of the present invention shown mounted in position to a wall.
Figure 8:
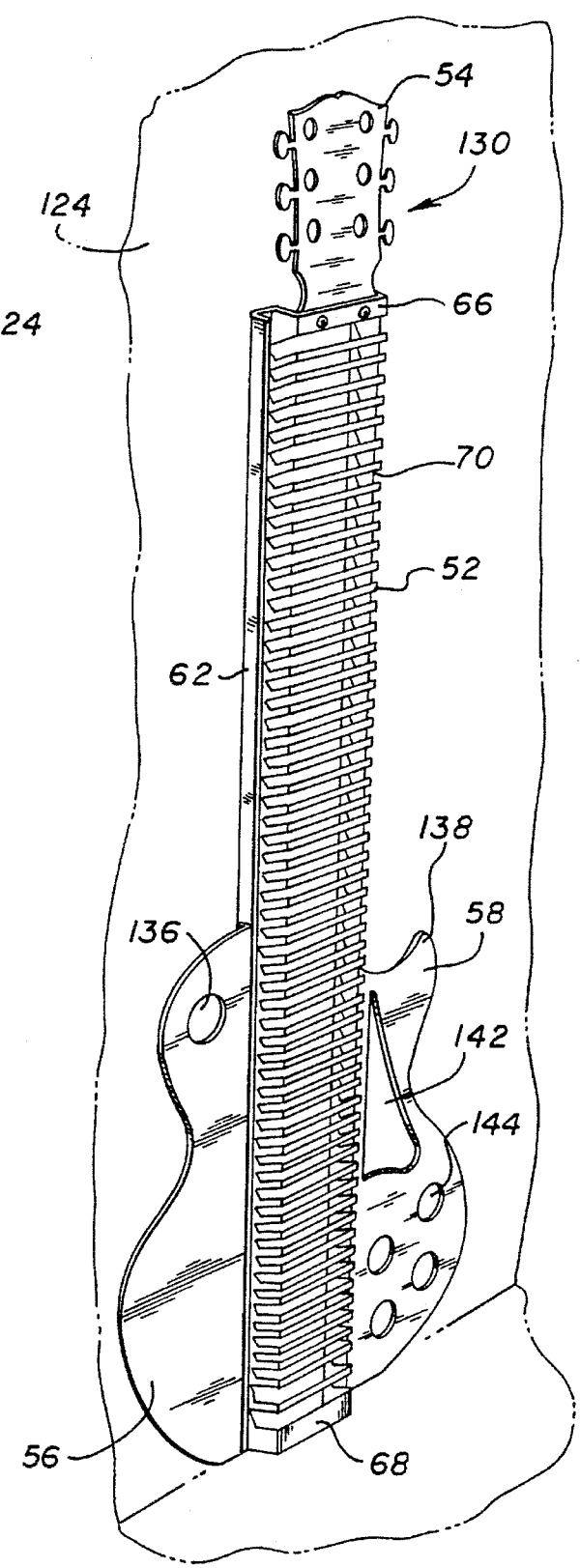
FIG. 8 is a perspective view of a further (an electric guitar) embodiment of the present invention, shown mounted in position to a wall.

Referring to the drawings, preferred embodiments of the present invention will now be described in detail. It is understood that when a variation or modification is shown in one figure that it can be employed in the other embodiments as would be apparent to one skilled in the art and in various combinations thereof. For example, the "special" case holder shown in FIG. 2 can be used in any of the other embodiments. Similarly, the double-sided, the base mounted, or the wall mounted variations can be used on embodiments other than those on which they are illustrated in the drawings. Additionally, the assembly can be configured to define objects other than the musical instruments as depicted in the drawings and the objects as listed at the end of this disclosure, as would be apparent.

Figure 15:
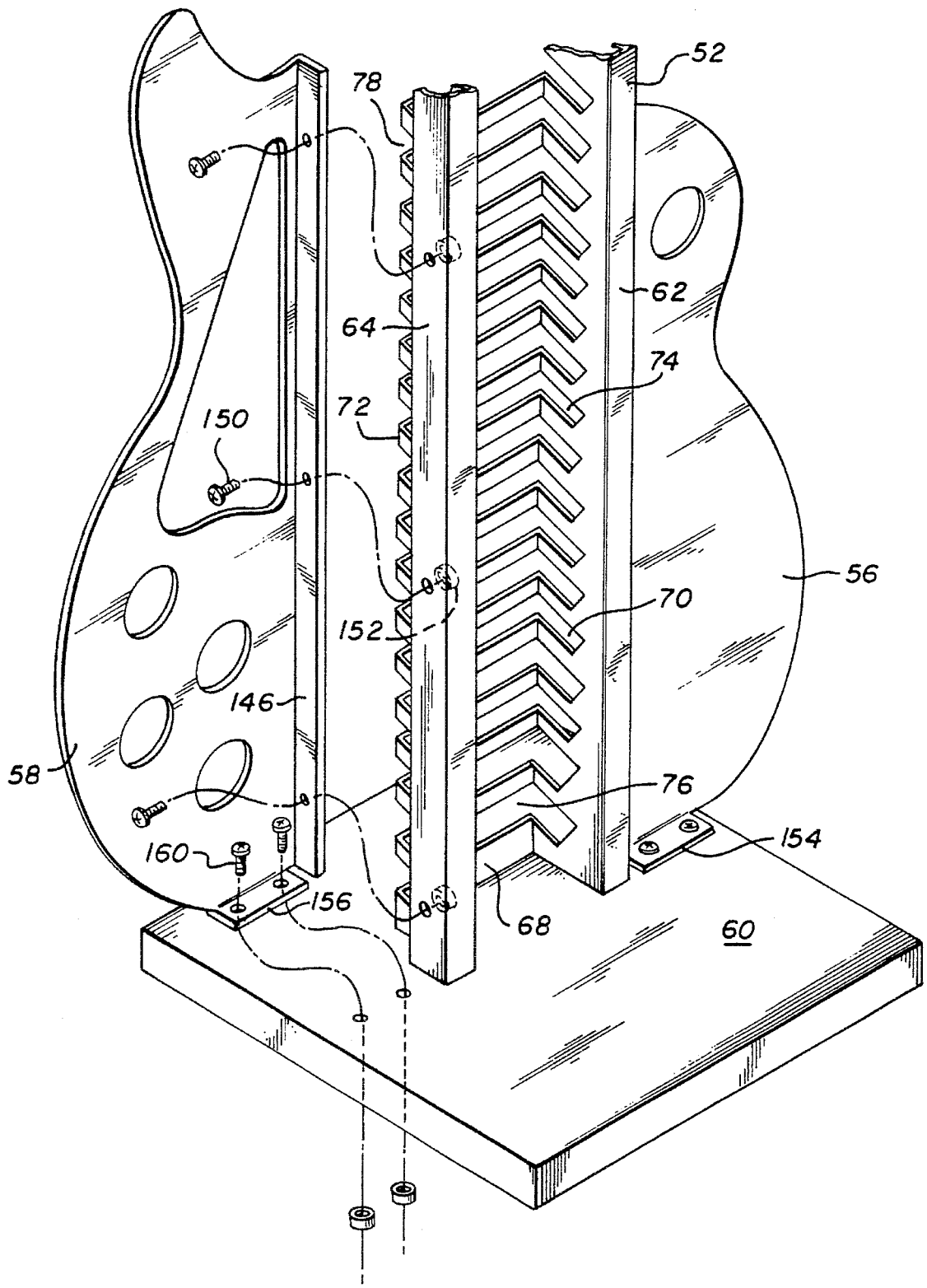
FIG. 15 is a rear, exploded perspective view of the bottom portion of FIG. 14, depicting assembly (or disassembly) thereof.

FIGS. 1 through 3 depict a first storage assembly embodiment of the present invention generally at 50. Assembly 50 includes an upright storage unit 52, a top member 54, a first side member 56, a second side member 58, and a base unit 60. The storage unit 52, as depicted, is that known in the prior art and as mentioned above. It includes first and second spaced side frame members 62, 64, a top connector member 66, a bottom connector member 68, and a plurality of spaced ribs 70 extending between the first and second frame members. As shown in FIG. 15, for example, each of the ribs 70 includes side portions 72, 74 slanted forward and upward (or horizontally) and a middle lateral connecting portion 76. Each of the ribs 70 is spaced one from another thereby defining inclined (or horizontal) slots 78 for receiving cases (downwardly and rearwardly) therein. Examples of these cases are shown in FIG. 3 at 80 and 82. Referring thereto it is seen that the slots 78 can be of different sizes or widths to accommodate small cases 80 as well as larger cases 82 or more than one small case.

The side frame members 62, 64 are configured as U-shaped channels, as will be apparent from the later-discussed top and bottom views of similar embodiments.

The entire storage unit 52 is made from solid steel. The storage unit 52 according to one preferred embodiment has fifty-eight slots 78, and another has fifty slots. However, any number of slots 78 as would be practical and desirable can be used. Although the thin rectangular cross-sectional shape storage unit 52 is depicted in the figures and is a preferred configuration, it is within the scope of the invention to use generally any type of tower storage unit. For example, the pentagonal design of the '642 patent or the Probell design can be used. Also, instead of the ribs 70 extending between the two frame members 62, 64, short opposing ribs each attached to only one frame member, such as shown in U.S. Pat. Nos. 4,655,345 and 4,453,785, can be used. Alternatively, receiving slots can be cut or otherwise formed in the opposing inside faces of the frame members for receiving and holding the side edges of the cases, and the ribs omitted. However, by having the ribs 70 extend between the two frame members 62, 64, especially for a tall elongated tower structure, the ribs advantageously form additional cross bracing and connectors between and for the frame members.

The top member 54 and the first and second members 56, 58 can be formed of any suitable material. An example of such a material is wood such as shown in the embodiment(s) of FIGS. 1 through 3. The first and second members 56, 58 are placed in an abutting relation with the lower edges of the frame members 62, 64 and then secured thereto, for example as by using screws 86, such as shown in FIG. 2. Screws 85 pass out through the outer lips 88, 89 of the U-shaped frame members 62, 64 and in through the side edges of the first and second side members 56, 58. The top member 54 is similarly secured with screws 87 or other fasteners to the top connector member 66. Alternatively, the side members (56, 58) and/or the top member (54) can be formed as a continuous wall to which the rear surface of the storage unit (52) is mounted. Although this wall embodiment may need more (steel) material, it will be easier to produce than the separate member embodiment.

Figure 23:
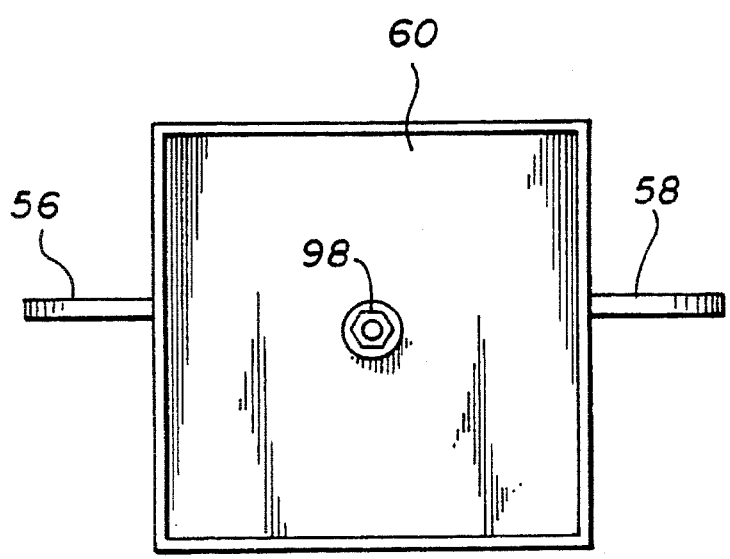
FIG. 23 is a bottom plan view thereof.
Figure 26:
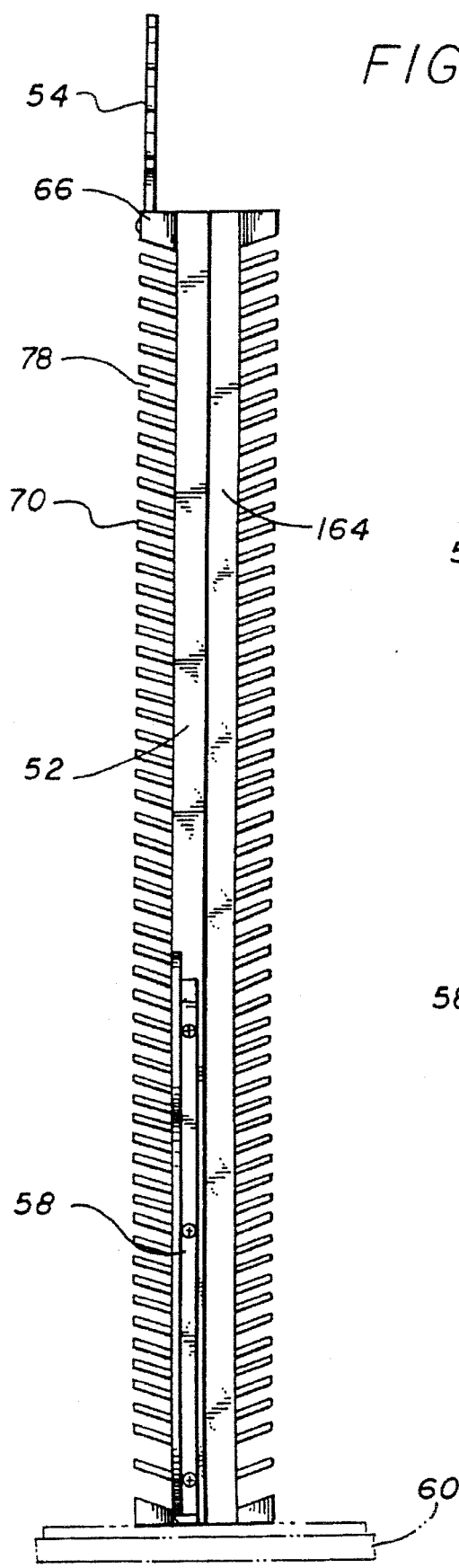
FIG. 26 is a right side elevational view thereof.
Figure 27:
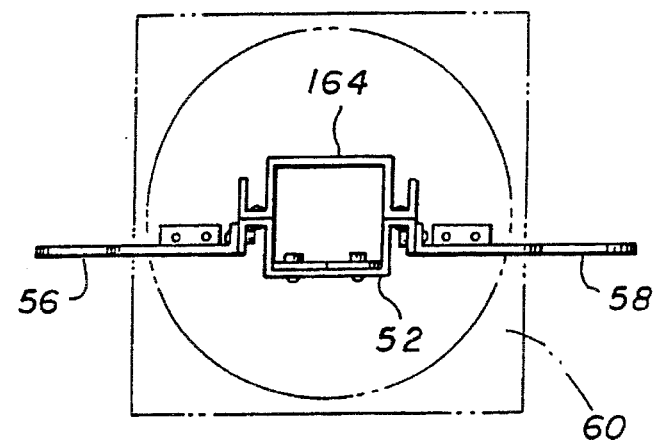
FIG. 27 is a top plan view thereof.
Figure 28:
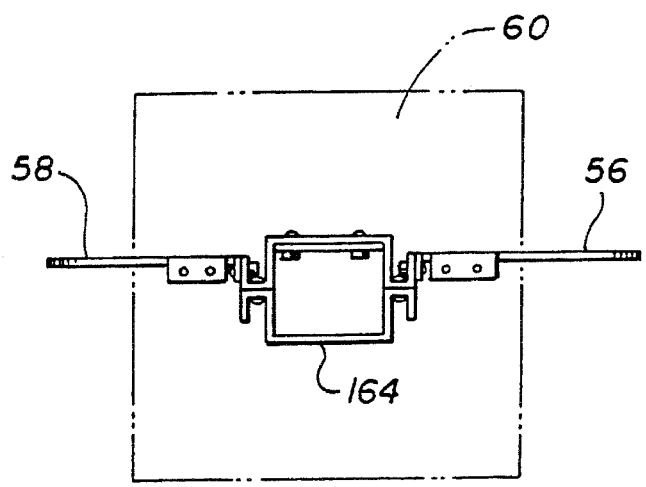
FIG. 28 is a bottom plan view thereof.

FIGS. 1 through 3 show an embodiment which is mounted to a base 60, and particularly a rotatable base. The embodiment of FIGS. 1 through 3 is a single-sided storage unit embodiment (as compared with the double-sided embodiments of FIGS. 18 and 24 for example). A base which is rotatable is usually not needed for the single-sided embodiment, however. The rotatable base 60 when used can be a "Lazy Susan" type construction, a construction such as illustrated in U.S. Pat. No. 3,543,943, or the swivel base such as illustrated in the "Storage Tower Collection" publication by Model No. 1211. It essentially includes a top plate 90 and a spindle 92 connected to the top plate with the top plate and the spindle being supported by and in a top opening of a base member 96, and held by a screw or nut 98 as shown in FIG. 23.

The top member 54, first side member 56, and second side member 58 each have front faces. The front faces can define generally broad planar surfaces to which holders 102 are mounted for holding in flat upright orientation the "special" cases 104 as defined above. One construction of these holders 102 includes a pair of flexible clips 106 secured at their bottom ends to a horizontal plate strip 108 and having their upper ends 110 being free. Thus, the cases 104 can be slipped down in between the free ends 110 and the member face and into position as shown in FIGS. 1–3 with the resilient clips 106 holding them releasably in position against the member faces. FIG. 2 shows an embodiment with a similar holder 112 on the top member 54. Holders can be provided on all of the top member 54, first side member 56 and second side member 58, on only two of them, on one of them or on none of them, as desired.

Referring again to FIGS. 1 and 2, it is seen that the combination of the top member 54, the first side member 56, the second side member 58 and the storage unit 52 given their relative configurations and positionings clearly and quickly defines the outline of an acoustic guitar. The top member 54 defines the tuning head portion of the guitar, the first and second side members 56, 58 define the hollow guitar body portion, the storage unit 52 defines the neck of the guitar, and conveniently the ribs 70 define the frets thereof.

FIGS. 4 through 7 show a storage assembly embodiment of a slightly different shaped guitar. In particular, the top member 54 has (the guitar string) slots 116 and the small outer projections 118 form the tuning keys, screws or knobs of the guitar. Similarly, small arcuate openings 120 are provided in the first and second side members 56, 58 about a third of the way down from the top portions thereof and adjacent the connection to the storage unit 52. These form, in front view, the acoustical opening to the hollow guitar base.

The cross-sectional configuration of the storage unit 52 includes U-shaped first and second side frame members 62, 64 and shows the connections of the top member 54, first and second side members 56, 58 to the storage unit as illustrated in FIGS. 5 and 6. The embodiment of FIG. 4 shows the storage assembly mounted to a wall 124. This mounting can be by connecting suitable fasteners through openings in the storage unit 52, as is known in the art. Alternatively, the storage assembly 50 can be mounted to or can include a base unit 60, as shown in FIG. 7, so that it is thereby free-standing. Again, one or more of the storage unit 52, the first side member 56, and the second side member 58 can be directly mounted at their lower edges directly to the top of the base unit 60. It is expected that all three will be directly secured thereto but this is not necessarily required. Even if the first and second side members 56, 58 are not directly secured to the base unit 52, by directly abutting them at a distance spaced out from the frame members 62, 64, they provide a side-to-side bracing function for the upright storage assembly 50.

FIGS. 8–14 illustrate generally at 130 an electric guitar embodiment of the present invention. In particular, the top member 54 of guitar 130 has holes 132 and outwardly projecting tuning knobs 134 shaped similar to that of a real electric guitar. The first and second side members 56, 58 are not mirror images of each other, unlike the embodiments of the previous figures. Rather, similar to the typical electric guitar the first side member 56 has a top hole 136, and the second side member 138 has a curved stump portion 140, a generally triangular opening 142, and four lower openings 144. A preferred version of the electric guitar embodiment forms each of the top member 54, first side member and second side member 56, 58 out of steel, and each is formed in a tool die stamping process. Referring to FIGS. 15 and 16, the first and second side members 56, 58 both have on their inside vertical surfaces rearwardly projecting flanges 146, through which metal screws 150 or similar fasteners can pass into the outer flanges of the respective side frame members 62, 64, and held releasably in place by nuts 152. Similarly, bottom flanges 154, 156 are provided along the lower surfaces of the side members and down through which fasteners 160 can pass when the storage assembly 50 is to be mounted to a base plate 60, such as shown in FIG. 14.

It is expected that the storage assembly 50 will be marketed to the customer or ultimate user thereof in a disassembled condition with each of the components including the screws and the base member, if any, packed in a single box (not shown). By distributing it in a disassembled condition it allows for a smaller packing box to be used, it reduces the likelihood that any of the extending components will be broken off, and it eliminates a manufacturing step for the producer. Assembly by the user is extremely easy, and this can be understood from FIGS. 15 and 16, for example. Written instructions (not shown) can be provided in the box to assist the user in assembling the storage assembly 50. They are probably not needed though since the assembly steps would be apparent from the components themselves and the assembled picture (not shown) typically provided on the cover of box. In any event, the disassembled components are shown in FIG. 15 with the relative alignments and screw insertions illustrated. FIG. 16 shows a cross section of typical screw connections. Aside from screws other fastening means can be used, such as by gluing, tieing, holding, nailing, and welding.

Figure 22:
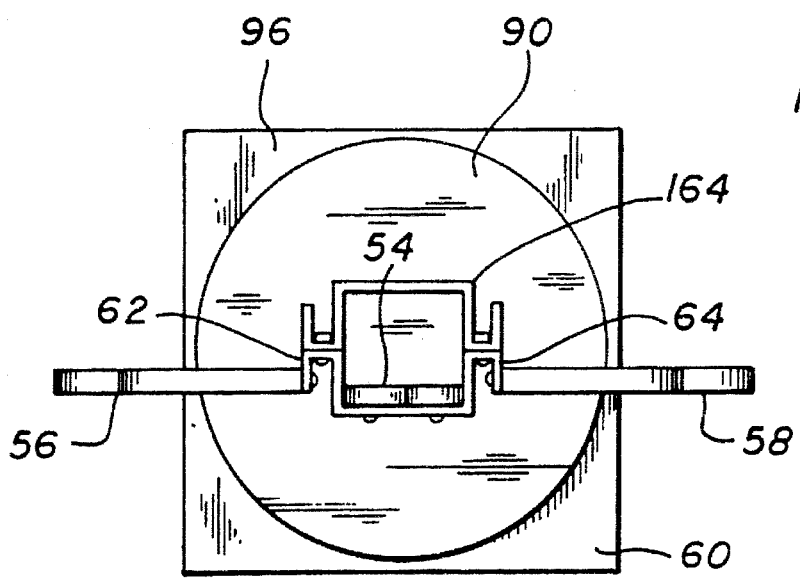
FIG. 22 is a top plan view thereof.

As previously mentioned, the storage assembly of the present invention can also be a two-sided version as shown in FIGS. 18 through 21, generally at 162. This is similar to the embodiment of FIG. 4, for example, but with a second storage unit 164 provided and secured in back-to-back relation with screws through the middle portions of the U-shaped flanges connecting the back-to-back units. The two storage units 52, 164 will typically be connected back-to-back together before the connection of the top member 54 and first and second side members 56, 58 to the first storage unit 52. The back-to-back storage units 52, 164 are secured to a rotatable base 60, such as previously discussed. The back-to-back relationship mounted to the rotatable base 60 is shown in FIG. 22. FIG. 23 is simply a bottom view of the assembly of FIG. 22 showing the connector screw and nut 98 for connecting the rotatable base 90 to the bottom base 96.

A two-sided electric guitar embodiment is shown in FIGS. 24–28 generally at 170, with the embodiment of FIG. 24 having a special case holder 102 mounted on the first side member 56. Since assembly 170 is two sided it is mounted on a rotatable base 60. Additional construction, configuration and operation details of assembly 170 can be understood from the previously-described embodiments of the other figures.

FIGS. 1–16 and 18–28 show storage assembly embodiments of the present invention wherein guitar shapes are defined. It is expected that the guitar shape, whether an acoustic guitar or an electric guitar, or other stringed musical instruments will be the preferred designs. This is because these designs take good advantage of the configuration of the storage unit 52 itself, defining with its straight parallel frame members 62, 64 the neck of the instrument and with its ribs 70, the frets thereof. Since the "cases" will typically include musical media, it is expected that the object outlined by the present storage assembly will preferably be a musical instrument.

In addition to the stringed musical instruments, an example of an alternative defined object is the saxophone as illustrated in FIG. 17 generally at 170. It is seen there that only one side member 56 is used and it defines the horn portion 172 of the saxophone. It further includes a surface extending along the top portion of the mounting base 60 and preferably secured thereto and thereby providing a bracing function for the storage unit 52. The top member 54 is configured to define an angled mouthpiece 176, which angles to the opposite side of the storage unit 52 as the horn portion 172. In addition to being an accurate depiction of a saxophone, the opposite side positioning provides for a more balanced design. It is noted that for the saxophone embodiment 170 as well as the guitar embodiments of the other figures that the top(s) of the first (and second) side member(s) 54, 56 is (or are) spaced a distance well below the top of the storage unit 52 and in fact below the middle of the storage unit. These configurations, pursuant to this invention, take advantage of the shape and configuration of the storage unit 52 itself. Thus, the storage unit 52 and particularly the frame members 62, 64 thereof, can define a connector member, a neck, a trunk or similar portion of the object represented. Examples of other objects which can be depicted by the assembly (50) are trees (particularly palm trees) and fluid containers (such as beer bottles, wine bottles, wine glasses, cocktail glasses and water glasses, where the storage unit (52) defines the drinking straw in or the neck of the container). For sports enthusiasts, the object defined can be golf clubs, baseball bats, swords, rifles, tennis rackets or basketball hoops. Other objects include skyscrapers, space rockets, lamps, tennis rackets, banjos, trumpets, keyboards, and microphones with stands. These objects or the outlines or profiles thereof are typically defined when the assembly (50) is viewed from the front elevational perspective. It is within the scope of the invention though to construct the assembly so to define the object when the assembly is viewed from other angles, such as from the top, bottom or side thereof.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the claims appended hereto.

What is claimed is:

1. A storage assembly for holding selectively disc cases, tapes, cartridges and cassettes, said assembly comprising:

a storage unit including first and second side frame members and a plurality of ribs attached to and extending laterally between said side members and spaced longitudinally to thereby form a plurality of receiving slots, each said slot being adapted to hold selectively the disc cases, tapes, cartridges and cassettes;

a top member secured to said storage unit and extending up from the top thereof;

a first side member secured to said storage unit and extending laterally out from a lower portion thereof; and a second side member secured to said storage unit and extending laterally out from a lower portion thereof in the opposite lateral direction as said first side member;

wherein said top member, said first side member, said second side member and said storage unit are configured and positioned relative to one another such that in a front elevational view they define a readily recognizable shape of a stringed musical instrument having an elongated neck and frets; and wherein said ribs form the frets and said frame members form at least in part the neck.

2. A storage assembly for holding selectively disc cases, tapes, cartridges or cassettes, said assembly comprising:

a storage unit including first and second elongated, spaced side frame members, a top connector extending between said side members at the tops thereof, and a plurality of ribs attached to said side members and spaced longitudinally relative thereto to thereby form a plurality of receiving slots, each said slot being adapted to hold selectively the cases, tapes, cartridges or cassettes;

a top member releasably securable to said top connector in a secured position extending up from said unit;

a first side member releasably securable to said first side frame member in a secured position extending laterally out from a lower portion of said unit;

a second side member releasably securable to said second side frame member in a secured position extending laterally out from a lower portion of said unit in the opposite direction of said first side member when in its secured position;

wherein said top member, said first side member and said second side member are configured such that when in their respective secured positions they, together with said unit, define at least the readily recognizable outline of a common, non-storage unit object; and a base to which said unit is connectable in an upright disposition;

wherein said first side member is directly securable to said base with said unit in the upright disposition; and wherein the object is a stringed musical instrument having frets and said ribs form the frets.

3. The assembly of claim 2 further comprising holding means for holding generally upright, selectively one of the cases, tapes, cartridges and cassettes on a front face of at least one of said top, first side and second side members.

4. The assembly of claim 2 further comprising said storage unit defining a first storage unit, said base comprising a rotatable base, and a second storage unit mountable to said rotatable base in a back-to-back relation with said first storage unit.

5. The assembly of claim 4 wherein said top member forms a turning handle which can be grasped and turned to alternatively forwardly dispose said first and second storage units as desired.

6. The assembly of claim 2 wherein said storage unit defines a neck portion of the object.

7. The assembly of claim 2 wherein said ribs are each connected at opposite ends thereof to said first and second side members, each said rib including a first rib portion slanted generally upwardly and forwardly from said first side member, a second rib portion slanted generally upwardly and forwardly from said second side member and a connector rib portion connecting said first and second rib portions.

8. The assembly of claim 2 wherein said first side member includes along a lower surface thereof a rearwardly disposed securing flange for securing said first side member to a base unit.

9. The assembly of claim 2 wherein the object has a trunk and said frame members define at least a portion of the trunk.

10. The assembly of claim 2 wherein said top member when in the secured position has a lowermost surface, said first side member when in the secured position has an uppermost surface, said second side member when in the secured position has an uppermost surface, and said lowermost surface is spaced a distance above both said uppermost surfaces.

11. A storage assembly for holding selectively disc cases, tapes, cartridges or cassettes, said assembly comprising:

a storage unit portion including first and second side walls and slot means for forming between said side walls a column of slots, each said slot for receiving and holding therein selectively disc cases, tapes, cartridges or cassettes, said storage unit portion having a top area, a bottom area, a first side area and an opposite second side area;

a base portion supporting said storage unit portion in an upright disposition;

a first side portion extending out from said first side area, said first side portion abutting said base portion at a location spaced laterally out from said first side wall to thereby at least in part brace the upright disposition of said storage unit portion relative to said base portion; and a second side portion extending out from said second side area, said second side portion abutting said base portion at a location spaced laterally out from said second side wall to thereby at least in part brace the upright disposition of said storage unit portion relative to said base portion;

wherein said storage unit portion, said first side portion and said second side portion together define a readily recognizable outline of a non-storage unit object; and wherein the object is a stringed musical instrument having frets and a neck having neck sides; and said first and second side walls form the neck sides and at least some of said slots form the frets.

12. A storage assembly for holding selectively disc cases, tapes, cartridges or cassettes, said assembly comprising:

a storage unit portion including first and second side walls and slot means for forming between said side walls a column of slots, each said slot for receiving and holding therein selectively disc cases, tapes, cartridges, or cassettes, said storage unit portion having a top area, a bottom area, a first side area and an opposite second side area;

a base portion to which said storage unit portion is directly secured in an upright disposition;

a bracing portion extending out from said first side area and directly secured to said base portion;

a top portion extending out from said top area;

wherein said storage unit portion, said bracing portion and said top portion are configured to together define an outline of a readily recognizable, non-storage unit object; and wherein the object is a stringed musical instrument having frets and a neck, said slots forming the frets and said side walls forming the neck.

13. The assembly of claim 1 wherein the stringed musical instrument includes a body and a tuning head, said top member forming the tuning head and said first and second side members forming the body.

14. The assembly of claim 1 wherein said first and second side members both comprise flat plates.

15. The assembly of claim 1 wherein said top member, said first side member and said second side member are each releasably securable in position to said storage unit.

16. The assembly of claim 2 wherein said first side member braces at least in part said unit in the upright disposition.

17. The assembly of claim 2 wherein said second side member is directly securable to said base and said first and second side members brace from opposite sides said unit in the upright disposition.

18. The assembly of claim 2 wherein the object has a body portion and said first side member forms at least a part of the body portion.

19. The assembly of claim 11 wherein said first and second side portions both comprise flat plates.

20. The assembly of claim 11 further comprising holding means for holding generally upright, selectively one of the cases, tapes, cartridges or cassettes on a front face of at least one of said top, first side and second side members.

21. The assembly of claim 12 wherein the stringed musical instrument has a tuning head, and said top portion forms the tuning head.

22. A storage assembly for holding selectively disc cases, tapes, cartridges or cassettes, said assembly comprising:

a storage unit including first and second side frame members and a plurality of ribs attached to and extending laterally between said side members and spaced longitudinally to thereby form a plurality of receiving slots, each said slot being adapted to hold selectively the disc cases, tapes, cartridges or cassettes;

a top member secured to said storage unit and extending up from a top thereof:

a first side member secured to said storage unit and extending laterally out from a lower portion thereof; and a second side member secured to said storage unit and extending laterally out from a lower portion thereof in the opposite lateral direction as said first side member;

wherein said top member is spaced a distance above tops of said first and second side members;

wherein said top member, said first side member, said second side member and said storage unit are configured and positioned relative to one another such that in a front elevational view they collectively define a readily-recognizable shape of a stringed musical instrument having an elongate neck, frets, a tuning head and a body; and wherein said ribs form the frets, said frame members form at least in part the neck, said top member forms the tuning head, and said first and second side members form the body.

23. The assembly of claim 22 wherein the stringed musical instrument is a guitar.

24. The assembly of claim 22 wherein said first and second side members both comprise flat plates.

25. The assembly of claim 24 wherein both of said flat plates have through-holes corresponding to portions of the stringed musical instrument.

26. The assembly of claim 22 further comprising holding means for holding generally upright, selectively one of the cases, tapes, cartridges or cassettes on a front face of at least one of said top, first side and second side members.

27. A storage assembly for holding selectively disc cases, tapes, cartridges or cassettes, said assembly comprising:

a storage unit including first and second elongated, spaced side frame members, a top connector extending between said side frame members at the tops thereof, and a plurality of ribs attached to said side frame members and spaced longitudinally relative thereto to thereby form a plurality of receiving slots, each said slot being adapted to hold selectively the cases, tapes, cartridges or cassettes;

a top member releasably connectable to said top connector in a secured position extending up from said unit;

a first side member releasably connectable to said first side frame member in a secured position extending laterally out from a lower portion of said unit;

a second side member releasably connectable to said second side frame member in a secured position extending laterally out from a lower portion of said unit in the opposite direction as said first side member when in its secured position;

wherein said top member, said first side member and said second side member are configured such that when in their respective secured positions they, together with said unit, define at least substantially all of a readily-recognizable outline of a common, non-storage unit object having an object head and an object body;

wherein said storage unit defines a tint storage unit;

a rotatable base to which said first storage unit is securable in an upright disposition; and a second storage unit mountable relative to said rotatable base in a back-to-back relation with said first storage unit;

wherein said top member forms a turning handle which can be grasped and turned to alternatively forwardly dispose said first and second storage units on said rotatable base as desired;

wherein said top member forms the object head and said first and second side members form at least in substantial part the object body; and wherein the object is a stringed musical instrument having a tuning head and said turning handle forms the tuning head.

28. The assembly of claim 27 wherein said top member is spaced a distance above said first and second side members.

29. The assembly of claim 27 wherein said first and second side members both comprise flat plates.

30. The assembly of claim 27 wherein the stringed musical instrument has frets and a neck, said slots form the frets and said side frame members form the neck.

31. The assembly of claim 27 wherein said first and second side members are secured directly to said rotatable base and thereby brace said first storage unit in an upright disposition.

32. A storage assembly for holding selectively disc cases, tapes, cartridges or cassettes, said assembly comprising:

a storage unit including first and second side frame members and a plurality of ribs attached to and extending laterally between said side members and spaced longitudinally to thereby form a plurality of receiving slots, each said slot being adapted to hold selectively the disc cases, tapes, cartridges or cassettes;

a support member secured to said storage unit and extending out from said storage unit and having generally flat forwardly-disposed vertical face; and holding means on said vertical face for holding generally Upright and in a plane generally parallel to said vertical face one of the cases, tapes, cartridges or cassettes.

33. The assembly of claim 32 wherein said support member extends laterally out from said storage unit:

34. The assembly of claim 32 wherein said support member extends vertically up from said storage unit.

35. The assembly of claim 32 wherein said support member is releasably securable to said first side frame member.

36. The assembly of claim 32 wherein said holding means includes at least one resilient holding clip secured at one end to said support member.

37. The assembly of claim 32 wherein said support member comprises a flat plate.

38. A storage assembly for holding selectively disc cases, tapes, cartridges or cassettes, said assembly comprising:

a storage unit including first and second elongated, spaced side frame members, a top connector extending between said side frame members at the tops thereof, and a plurality of ribs attached to said side frame members and spaced longitudinally relative thereto to thereby form a plurality of receiving slots, each said slot being adapted to hold selectively the cases, tapes, cartridges or cassettes;

a top member releasably connectable to said top connector in a secured position extending up from said unit;

a first side member releasably connectable to said first side frame member in a secured position extending laterally out from a lower portion of said unit;

a second side member releasably connectable to said second side frame member in a secured position extending laterally out from a lower portion of said unit in the opposite direction as said first side member when in its secured position;

wherein said top member, said first side member and said second side member are configured such that when in their respective secured positions they, together with said unit, define at least substantially all of a readily-recognizable outline of a common, non-storage unit object having an object head and an object body;

wherein said storage unit defines a first storage unit;

a rotatable base to which said first storage unit is securable in an upright disposition; and a second storage unit mountable relative to said rotatable base in a back-to-back relation with said first storage unit;

wherein said top member forms a turning handle which can be grasped and turned to alternatively forwardly dispose said first and second storage units on said rotatable base as desired;

wherein said top member forms the object head and said first and second side members form at least in substantial part the object body; and wherein the object is a stringed musical instrument having frets and a neck, said slots form the frets and said side frame members form the neck.

* * * * *